US010738590B2

(12) United States Patent
Ravi et al.

(10) Patent No.: US 10,738,590 B2
(45) Date of Patent: Aug. 11, 2020

(54) DYNAMIC SENSING OF THE TOP OF CEMENT (TOC) DURING CEMENTING OF A WELL CASING IN A WELL BORE

(71) Applicant: HALLIBURTON ENERGY SERVICES INC., Houston, TX (US)

(72) Inventors: Krishna M. Ravi, Kingwood, TX (US); Mark W. Roberson, Cary, NC (US); Scott Goodwin, Chapel Hill, NC (US)

(73) Assignee: HALLIBURTON ENERGY SERVICES INC., Houston, TX (US)

( * ) Notice: Subject to any disclaimer, the term of this patent is extended or adjusted under 35 U.S.C. 154(b) by 239 days.

(21) Appl. No.: 15/545,244

(22) PCT Filed: Mar. 20, 2015

(86) PCT No.: PCT/US2015/021786
§ 371 (c)(1),
(2) Date: Jul. 20, 2017

(87) PCT Pub. No.: WO2016/153465
PCT Pub. Date: Sep. 29, 2016

(65) Prior Publication Data
US 2018/0010438 A1 Jan. 11, 2018

(51) Int. Cl.
*E21B 47/005* (2012.01)
*E21B 33/14* (2006.01)
(Continued)

(52) U.S. Cl.
CPC ............ *E21B 47/005* (2020.05); *E21B 33/14* (2013.01); *E21B 47/11* (2020.05); *E21B 43/11* (2013.01);
(Continued)

(58) Field of Classification Search
CPC ............................ E21B 33/14; E21B 47/0005
See application file for complete search history.

(56) References Cited

U.S. PATENT DOCUMENTS 2,732,714 A * 1/1956 Bennet ................ E21B 47/0003
73/152.54
4,125,159 A * 11/1978 Vann ..................... E21B 33/138
166/281

(Continued)

FOREIGN PATENT DOCUMENTS

WO 2011017415 A2 2/2011

OTHER PUBLICATIONS

International Search Report and Written Opinion; PCT Application No. PCT/US2015/021786; dated Dec. 2, 2015.

(Continued)

*Primary Examiner* — William D Hutton, Jr.
*Assistant Examiner* — Steven A MacDonald
(74) *Attorney, Agent, or Firm* — Polsinelli PC

(57) ABSTRACT

A well casing is cemented in a well bore in a subterranean formation by pumping cement slurry down into the well casing so that the cement slurry flows up into an annulus surrounding the well casing. While pumping the cement slurry, the position of the top of the cement slurry in the annulus is sensed, and the rise of the sensed position of the top of the cement slurry in the annulus is recorded as a function of time. The recording is analyzed to evaluate the cement job. For example, the analysis may indicate a problem addressed by adjusting a cement plan for a future cement job, and the analysis may indicate a need to repair a location of the set cement by perforating the well casing at the location to be repaired, and pumping cement slurry down the well casing to fill the location to be repaired.

20 Claims, 14 Drawing Sheets

(51) Int. Cl.
*E21B 47/11* (2012.01)
*E21B 47/07* (2012.01)
*E21B 47/085* (2012.01)
*E21B 43/11* (2006.01)
*E21B 47/06* (2012.01)
*E21B 47/14* (2006.01)
*G01V 1/40* (2006.01)
*G01V 3/30* (2006.01)

(52) U.S. Cl.
CPC .............. *E21B 47/06* (2013.01); *E21B 47/07* (2020.05); *E21B 47/085* (2020.05); *E21B 47/14* (2013.01); *G01V 1/40* (2013.01); *G01V 3/30* (2013.01)

(56) References Cited

U.S. PATENT DOCUMENTS

| | | | | |
|---|---|---|---|---|
| 5,123,487 | A * | 6/1992 | Harris | C09K 8/5045 166/277 |
| 5,127,473 | A * | 7/1992 | Harris | C04B 7/527 166/277 |
| 5,484,020 | A * | 1/1996 | Cowan | C04B 41/483 166/285 |
| 7,712,527 | B2 | 5/2010 | Roddy | |
| 8,162,050 | B2 * | 4/2012 | Roddy | E21B 33/13 166/250.14 |
| 8,162,055 | B2 | 4/2012 | Lewis et al. | |
| 8,291,975 | B2 | 10/2012 | Roddy et al. | |
| 8,297,352 | B2 | 10/2012 | Roddy et al. | |
| 8,297,353 | B2 | 10/2012 | Roddy et al. | |
| 8,302,686 | B2 | 11/2012 | Roddy et al. | |
| 8,316,936 | B2 | 11/2012 | Roddy et al. | |
| 8,342,242 | B2 | 1/2013 | Roddy et al. | |
| 2011/0192597 | A1 | 8/2011 | Roddy et al. | |
| 2011/0199228 | A1 * | 8/2011 | Roddy | E21B 33/13 340/856.4 |
| 2013/0110403 | A1 * | 5/2013 | Krivosheev | E21B 47/0005 702/7 |
| 2014/0174732 | A1 * | 6/2014 | Goodwin | E21B 33/13 166/255.1 |
| 2014/0236357 | A1 | 8/2014 | Degrange | |
| 2014/0338896 | A1 * | 11/2014 | McGarian | E21B 47/0005 166/250.08 |

OTHER PUBLICATIONS

Chief Counsel Report "Well Cementing", National Commission on the BP Deepwater Horizon Oil Spill and Offshore Drilling; Chapter 4.3 Cement; Apr. 2010.

Cementing Basics; retrieved from the Internet: http://gekengineering.com/Downloads/Free_Downloads/Cementing.pdf.

Cementing Operations; http://petrowiki.org/cementing_operations?_ga=1.90869342.552524777.1420; Jan. 2, 2015.

* cited by examiner

DYNAMIC SENSING OF THE TOP OF CEMENT (TOC) DURING CEMENTING OF A WELL CASING IN A WELL BORE

CROSS-REFERENCE TO RELATED APPLICATIONS

This application is a national stage entry of PCT/US2015/021786 filed Mar. 20, 2015, said application is expressly incorporated herein in its entirety.

FIELD

The subject matter herein generally relates to well bore cementing operations, and in particular, cementing of a well bore casing in a well bore.

BACKGROUND

A well bore is often drilled into a subterranean formation for recovering hydrocarbons, storing hydrocarbons, or injecting other fluids, such as carbon dioxide or aqueous fluids, for storage or disposal, or for recovery of deposited minerals or geothermal energy.

Typically the well bore is lined with a steel casing through which fluid is conveyed under pressure. The steel casing is cemented in the well bore in order to provide zonal isolation so that the fluid is extracted from or delivered to selected zones or layers of the formation and prevented from leaking into other zones or layers of the formation and leaking into the surface environment. The cement also bonds to and supports the casing.

For a well drilled into a rock formation, the well bore is typically drilled into the rock, and then the casing is placed into the well bore in the rock. A cement slurry is then pumped down through the casing, and the cement slurry flows out the bottom of the casing and rises up into the annulus around the casing in the well bore. As the cement slurry is pumped, the pressure and flow rate are recorded in order to detect abnormalities. If abnormalities arise, the pumping is not stopped because the setting of the cement before completion of the pumping would create problems. Instead, the cementing job is evaluated by logging after the cement is set, and if the cement evaluation reveals problems, they are corrected by an expensive recementing job. The recementing job typically involves perforating the casing with shaped explosive charges, and then injecting cement slurry down the casing and through the perforations into the annulus around the casing in the well bore.

DETAILED DESCRIPTION

Figure 1:
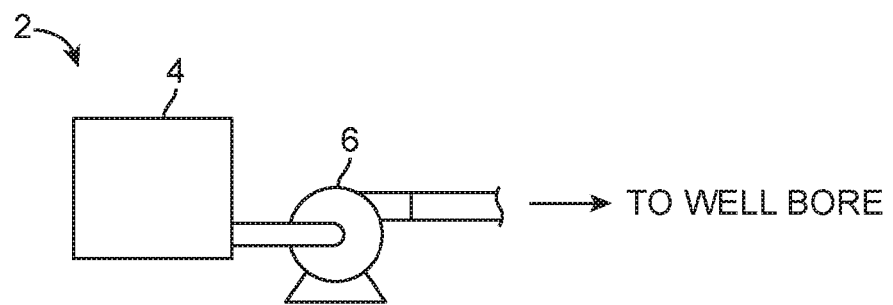
FIG. 1 illustrates a system for preparation and delivery of a cement composition to a well bore in accordance with aspects of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the following description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object.

As used herein, "cement" is any kind of material capable of being pumped to flow to a desired location, and capable of setting into a solid mass at the desired location. "Cement slurry" designates the cement in its flowable state. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, lost circulation materials, thixotropic agents, suspension aids, or combinations thereof.

The cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed cement compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Referring now to FIG. 1, a system that may be used in the preparation of a cement composition in accordance with example embodiments will now be described. FIG. 1 illustrates a system 2 for preparation of a cement composition and delivery to a well bore in accordance with certain embodiments. As shown, the cement composition may be mixed in mixing equipment 4, such as a jet mixer, re-circulating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2:
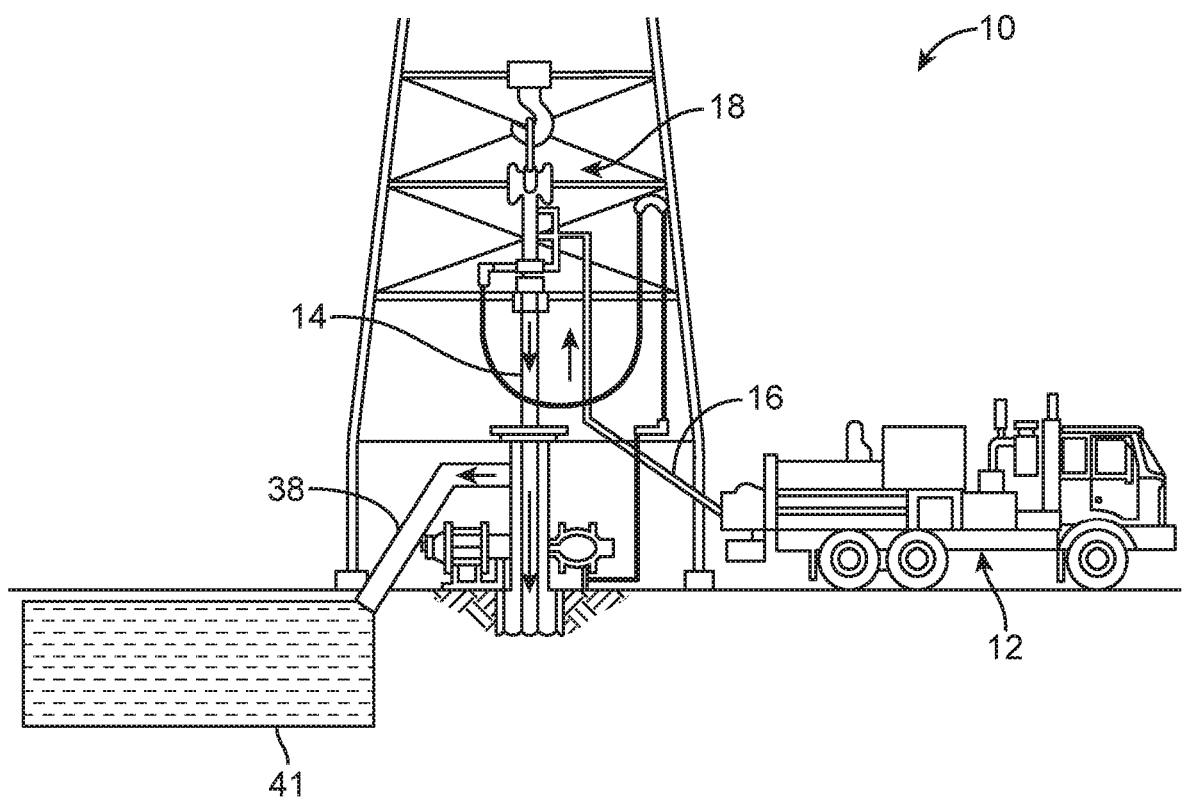
FIG. 2 is a diagram illustrating surface equipment that may be used in placement of a cement composition in a well bore in accordance with aspects of the present disclosure.

An example technique and system for placing a cement composition into a subterranean formation will now be described with reference to FIGS. 2 and 3. FIG. 2 illustrates surface equipment 10 that may be used in placement of a cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 3:
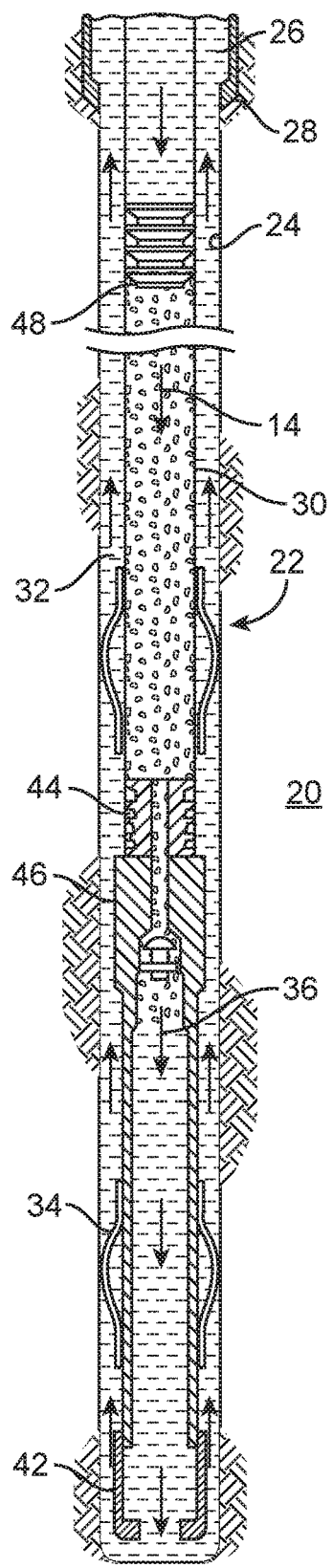
FIG. 3 is a diagram illustrating placement of a cement composition into a well bore annulus in accordance with aspects of the present disclosure.

Turning now to FIG. 3, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 3, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2. Referring again to FIG. 3, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 3, the bottom plug 44 is shown on the landing collar 46. In the illustrated embodiment, a top plug 48 may be introduced into the well bore 22 behind the binder composition 14. The top plug 48 may separate the cement composition 14 from a displacement fluid and also push the cement composition 14 through the bottom plug 44.

Figure 4:
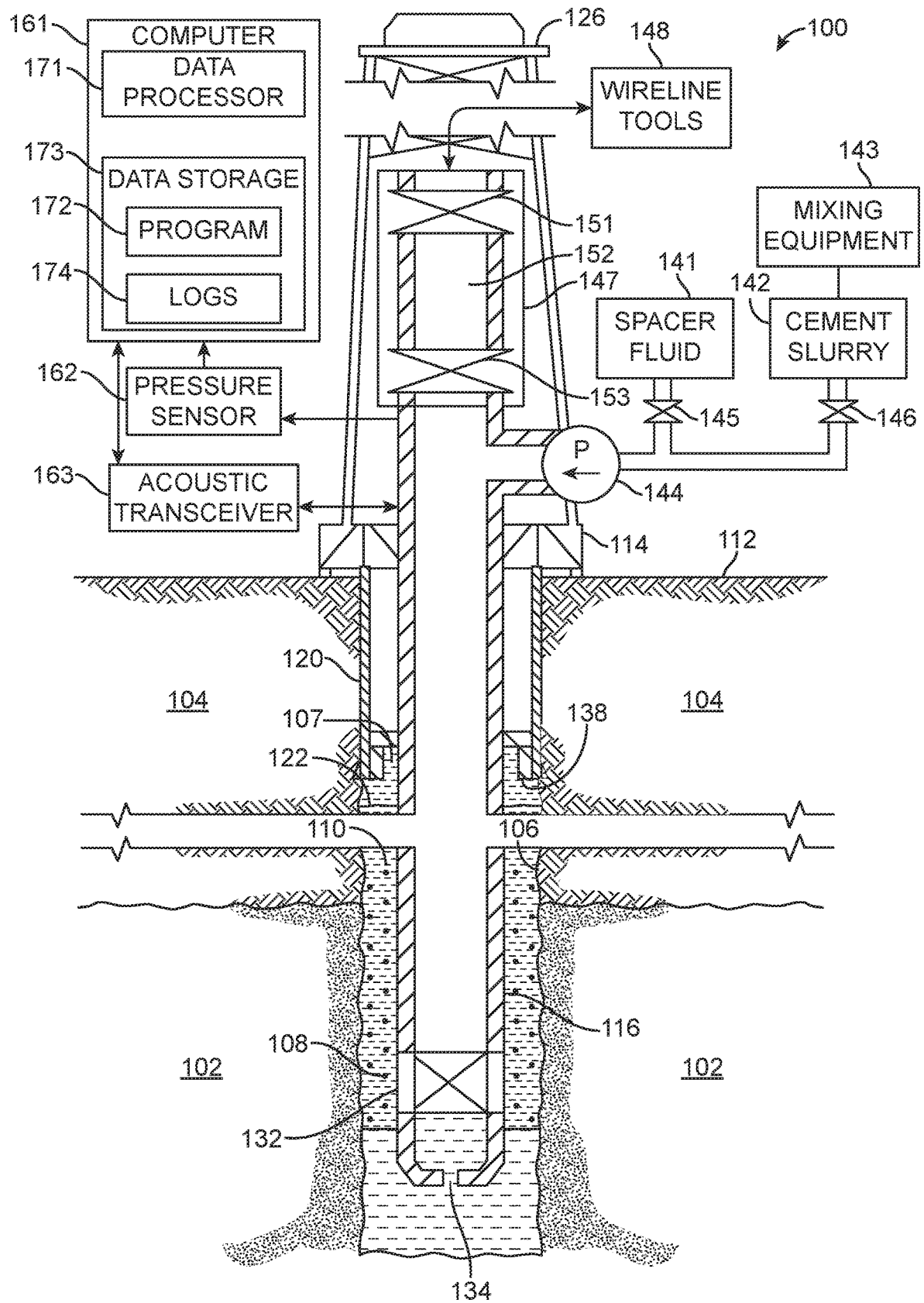
FIG. 4 is a diagram illustrating an example of a cementing system in accordance with certain embodiments of the present disclosure.

FIG. 4 shows another example of a cementing system 100 for cementing a well casing 116 in a well bore 106. The well bore 106 penetrates a production zone 102 and a non-production zone 104. The production zone 102 may be a subterranean formation including resources (e.g., oil, gas, water). The non-production zone 104 may be one or more formations that are isolated from the wellbore 106 by cement 108. For example, the non-production zone 104 may include contaminants that, if mixed with the resources, may result in requiring additional processing of the resources and/or make production economically unviable.

A cementing process may selectively position the cement 108 in the well bore 106. The cementing system 100 includes a drilling ring 114 centered over the subterranean oil or gas formation 102 located below the earth's surface 112. The drilling rig 114 has a derrick 126 for railing and lowering pipe strings, such as a string of drill pipe for initially drilling the well bore 106, and for lowering a surface casing 120 into the well bore 106, and then lowering a production casing 116 into the well bore. In some instances, the production casing 116 may rest on a lip 138 of the surface casing 120.

The cementing system further includes a spacer fluid tank 141, a cement slurry tank 142, mixing equipment 143 for mixing and adding additives to cement slurry in the cement slurry tank, a pump 144 for pumping fluid or slurry into the production casing 116, and respective valves 145 and 146 for admitting either spacer fluid or cement slurry into the pump 144. A pressure sensor 162 senses the pressure in the production casing 116 and is electronically coupled to a computer 161 to report the pressure to the computer. The computer 161 records the pressure and also records the pumping rate of the pump 144.

For example, the computer 161 is a general purpose digital computer having a data processor 171 executing instructions of a program 172 stored in non-transitory data storage 173. The data storage 173 also stores logs 174 of data from the wireline tools 148 and from other components of the cementing system 100. For example, the data storage 173 is a hard disk drive in the computer 161.

The top of the production casing 116 is capped with a pressure containment facility 147 for admitting selected wireline tools 148 that are lowered into the production casing. The pressure containment facility 147 has an upper value 151 that can be opened to receive a wireline tool into a lubricator chamber 152 and then the upper valve can be closed around the wire line of the tool. The pressure containment facility 147 also has a lower valve 153 that can be opened to permit the tool to pass from the lubricator chamber 152 into the production casing 116, and then the lower valve 153 can be closed around the wire line of the tool. The tool can then be lowered through the production casing 116 by pushing the wireline though the valves 151, 153. The tool can be raised back to the surface by pulling on the wireline at the surface. In some instances, when the tool is lowered below the surface 112 in the production casing 116, the tool communicates in real time with the computer 161 at the surface 112. For example, the tool transmits and receives data via acoustic telemetry. The computer 161 is electronically coupled to an acoustic transceiver 163 at the surface 112, and the acoustic transceiver transmits and receives acoustic signals conducted via the production casing to and from the tool lowered below the surface 112 in the production casing 116.

Prior to the cementing operation, the well bore 106 is flushed with spacer fluid 141. The spacer fluid 141 displaces any drilling mud and production hydrocarbon from the well bore 106, in order to promote bonding of the cement to the well bore 106 and the production casing 116 when the cement slurry is later injected into the annulus around the production casing in the well bore 116. Prior to the cementing operation, and prior to installation of the production casing 116, a well bore caliper tool is often lowered into the well bore 106 in order to measure the internal diameter and cross-section profile of the well bore. The internal diameter and cross-section profile provide an estimate of the amount of cement slurry that will be needed to fill the annulus around the production casing 116 in the well bore 106. The internal diameter and cross-section profile may also indicate problems that might be addressed before the cement slurry is injected into the annulus. For example, problems could be addressed by installing centralizers around the production casing 116 in the annulus, installing appliances in the annulus, or changing the composition of the cement slurry that will be injected into the annulus.

For injecting the cement slurry into the annulus, the pump 144 pumps the cement slurry from the tank 142 into the production casing 116, and the cement slurry flows down through the production casing and through a casing shoe 132 and out a perforation 134 at the bottom of the production casing. The casing shoe 132 may be a float shoe fitted with an open bottom and a valve that serves to prevent reverse flow, or U-tubing, of the cement slurry. The cement slurry then flows up into the annulus around the production casing 116 in the well bore 106, and the cement slurry displaces spacer fluid 107, which ends up on top of the set cement 108. While the cement slurry flows up into the annulus, there is a top of cement (TOC) 122 boundary that rises in depth below the surface 112 as a function of time.

The present disclosure is directed to sensing the top of cement (TOC) position during the injection of cement slurry into the annulus. There are a number of ways of sensing of the TOC position. One way is by using a wireline tool in the production casing 116 for sensing and tracking the TOC position. Another way is by using sensors attached to the production casing 116 at locations over a range of depth over which the TOC position is tracked. For example, the sensors are disposed on or embedded in the outer periphery of the production casing 116. In any case, additives, tracers, or tags 110 can be mixed into at least an initial portion of the cement slurry that is pumped into the production casing so that sensors may more precisely sense the TOC position as a function of time during the injection of the cement slurry into the annulus.

For example, the additives, tracers, or tags 100 may include magnetic material such as magnetized ferrite that can be sensed by magnetometers in order to differentiate between the spacer fluid and the cement slurry. The additives, tracers, or tags 100 may include ferromagnetic material such as iron or ferrite that could also be detected by magnetometers due to distortion of the Earth's magnetic field. The additives, tags, or tracers may include radioactive isotopes that could be detected by radiation detectors such as scintillators.

The additives, tracers, or tags 100 could include elements that have a high neutron cross section and become radioactive upon neutron activation, such as boron or cadmium, or upon activation by gamma rays. In this case, the additives, tags, or tracers could be activated by a pulsed neutron generator in a wireline tool, or by a radioactive source in a wireline tool.

The additives, tags, or tracers may be passive and may produce a return signal when energized or excited by an acoustic or electromagnetic interrogation signal. For example, the passive additives, tags, or tracers may reflect the interrogation signal or return a harmonic of the interrogation signal. In other examples, the additives, tags, or tracers may be active and include transceivers that transmit acoustic or electromagnetic return signals in response to receiving an acoustic or electromagnetic interrogation signal. The transceivers could delay the return signals or the return signals could be tuned to frequencies different from the interrogation signal so that the return signals would be more clearly distinguished from reflections of the interrogation signal from the surrounding formation. Active tags may be addressable by the interrogation signal. For example, active acoustic tags or radio frequency identification (RFID) tags may be addressable by a digital code in the interrogation signal.

Figure 5:
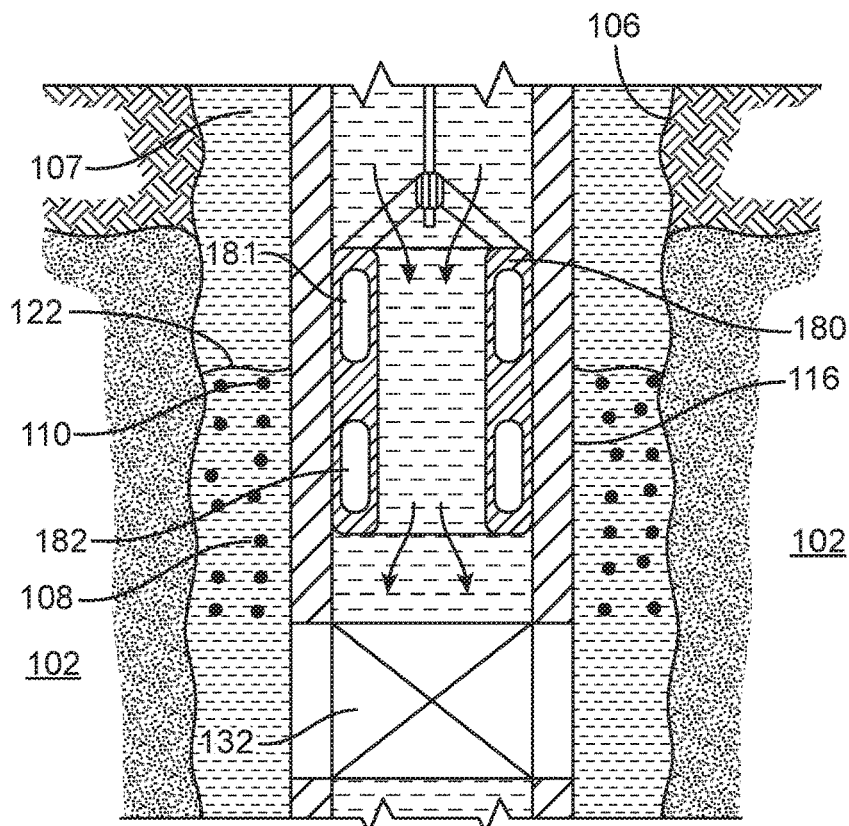
FIG. 5 is a diagram illustrating the use of a wireline tool for sensing the top of cement (TOC) during a cementing operation in the cementing system of FIG. 4.

FIG. 5 shows the use of a wireline tool 180 for sensing of the top of cement (TOC) during a cementing operation in the cementing system of FIG. 4. In this example, the wireline tool 180 includes an upper sensor 181 and a lower sensor 182. As the top of the cement (TOC) 122 rises, the wireline tool 180 is pulled upward in response to the sensor signals to keep the TOC midway between the sensors 181 and 182. For example, the wireline tool is pulled up so that the sensor 181 will sense an absence of cement slurry, and the sensor 182 will sense a presence of cement slurry. The sensors, for example, emit acoustic pulses, which easily pass through the steel of the production casing 116.

Figure 6:
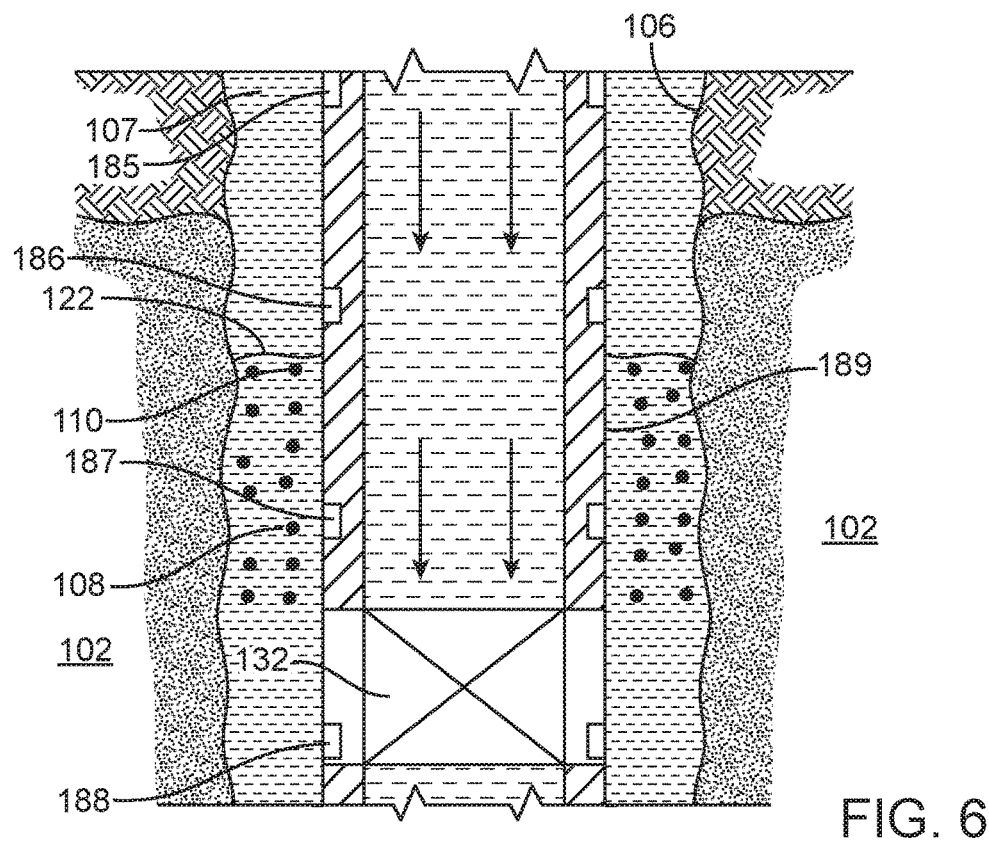
FIG. 6 is a diagram illustrating the use of sensors attached to a production casing for sensing the top of cement (TOC) during a cementing operation in the cementing system of FIG. 4.

FIG. 6 shows the use of sensors 185, 186, 187, 188 disposed on or in the outer periphery of a production casing 189 for dynamic sensing of the top of cement (TOC) during a cementing operation. This arrangement permits the use of sensors that transmit and receive electromagnetic signals, which would not easily pass through the steel of the production casing 189. In this example, the sensors 185, 186, 187, 188 are disposed at equally spaced locations at different depths in the well bore 106.

The sensors 185, 186, 187, 188 may communicate with the computer (161 in FIG. 4) at the surface via an electrical wire or cable extending up to the surface along the outer periphery of the production casing 189, or the sensors may communicate with the computer at the surface via wireless acoustic or wireless electromagnetic transmission. The sensors 185, 186, 187, 188 may communicate with each other to form a data network in which the upper sensors relay sensor data from the lower sensors up to the computer (161 in FIG. 4) at the surface. When an electrical wire or cable is used, the electrical wire or cable may supply power from the surface to the sensors 185, 186, 187, 188. When an electrical wire or cable is not used, each of the sensors may have batteries for powering the sensor. The batteries may be inductively rechargeable via a wireline tool that is lowered into the well casing to come into close proximity with the sensor.

Active acoustic tags or active electromagnetic tags in the cement may also communicate with each other so that the sensors 185, 186, 187, 188 may be spaced apart from each other by a distance much greater than the maximum range for direct signal transmission from each sensor to each active tag. Thus, the tags themselves may form a data network for relaying interrogation signals from the sensors to the tags and for relaying return signals from the tags to the sensors.

The active tags themselves may sense their own location and local properties of the fluid or slurry in which the tags are embedded, and communicate this information among themselves to relay this information from the bottom of the well bore or the bottom of the casing up to a receiver at the surface or up to a receiver at an intermediate depth in the well bore. The receiver at the surface could be the acoustic transceiver 163 in FIG. 4. The receiver at the intermediate depth could be a sensor disposed in or one the well casing, such as one of the sensors 186, 187, 188 in FIG. 6. The receiver at the intermediate depth could relay the information from the active tags up to the surface using acoustic transmission through the casing or via a wire line or fiber optic cable or electromagnetically. The active tags may be dispersed in fluid other than cement slurry in the well bore and the local properties of the fluid or cement slurry sensed by the active tags may be used to distinguish tags located in cement slurry from tags located in fluid that is not cement slurry.

For example, the tags may sense their location such as their depth along the length of the borehole as well as their location inside or outside the casing and their azimuthal position around the casing. The tags may sense local slurry or fluid properties such as PH, electrical conductivity, temperature, pressure, acoustic velocity, acoustic impedance, etc. The tags may also keep track of time and may time stamp their sensed location and local slurry or fluid property information so that the information ultimately received at the surface indicates the well bore state as a function of time as well as depth and azimuthal position. Therefore, a recording of the information received at the surface can be analyzed at any time after all of the cement has been pumped into the wellbore in order to determine the top of cement (TOC) position as a function of time.

Each of the sensors 185, 186, 187, 188 may have an acoustic or electromagnetic transceiver for communicating with the acoustic or electromagnetic tags, an electromagnetic or acoustic transceiver for communicating with neighboring sensors, and a data processor electronically coupled to the transceivers. The data processor may include a memory component for storing data from the tags, and the data may be transmitted at a later time up to the computer (161 in FIG. 4) at the surface.

Each of the sensors 185, 186, 187, 188 may also directly sense the presence of cement or other well bore properties without the use of the tags. For example, each of the sensors 185, 186, 187, 188 may have an acoustic transceiver for sensing the presence of cement or fluid between the acoustic transceiver and the formation wall of the well bore, and for sensing the acoustic properties of such cement or fluid. Each of the sensors 185, 186, 187, 188 may also have a local pressure sensor and a local temperature sensor in order to report the local pressure and temperature in the well bore up to the computer (161 in FIG. 4) at the surface.

Figure 7:
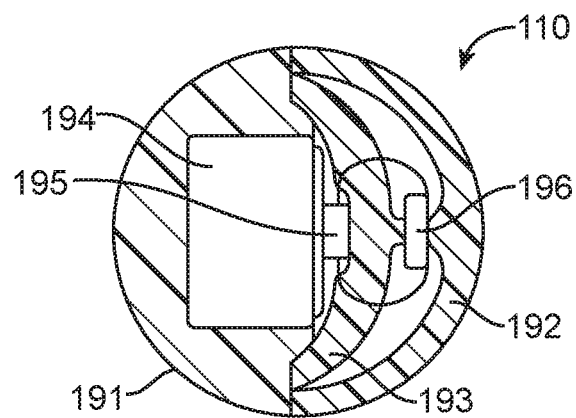
FIG. 7 is a cross-section view of an acoustic tag that may be used in the cementing operation of FIG. 5 or FIG. 6.

FIG. 7 is a cross-section view of an active acoustic tag 110 that may be used in the cementing operation of FIG. 5 or FIG. 6. The tag 110 includes a hemispherical body 191, an outer hemispherical shell 192, and an inner shell 193. For example, the shells are made of ceramic or thermo-set polymer loaded with ceramic powder. A battery 194 is received in the body 191, a transceiver integrated circuit chip 195 is disposed between the battery and the inner shell 193, and a piezoelectric acoustic transducer chip 196 is disposed between the inner shell 193 and the outer shell 192. The components of the tag 110 are bonded together with adhesive such as epoxy glue.

Figure 8:
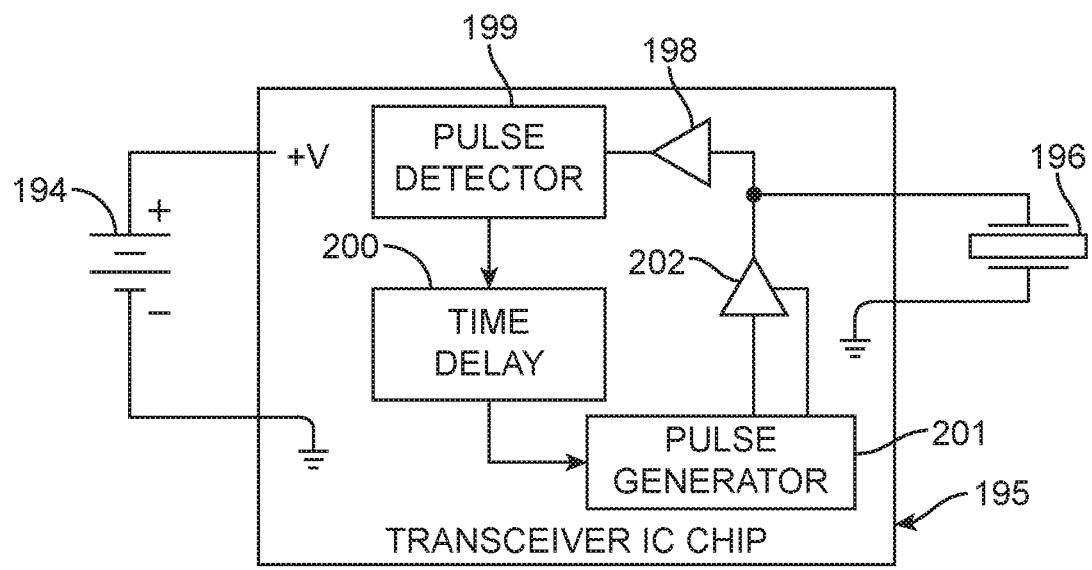
FIG. 8 is a schematic diagram of circuitry in the acoustic tag of FIG. 7.

FIG. 8 shows the circuitry in the active acoustic tag of FIG. 7. The transceiver integrated circuit (IC) chip 195 contains complementary metal oxide semiconductor (CMOS) circuitry including an analog amplifier 198, an interrogation pulse detector 199, a time delay circuit 200, a return pulse generator 201, and a buffer-driver 202.

Figure 9:
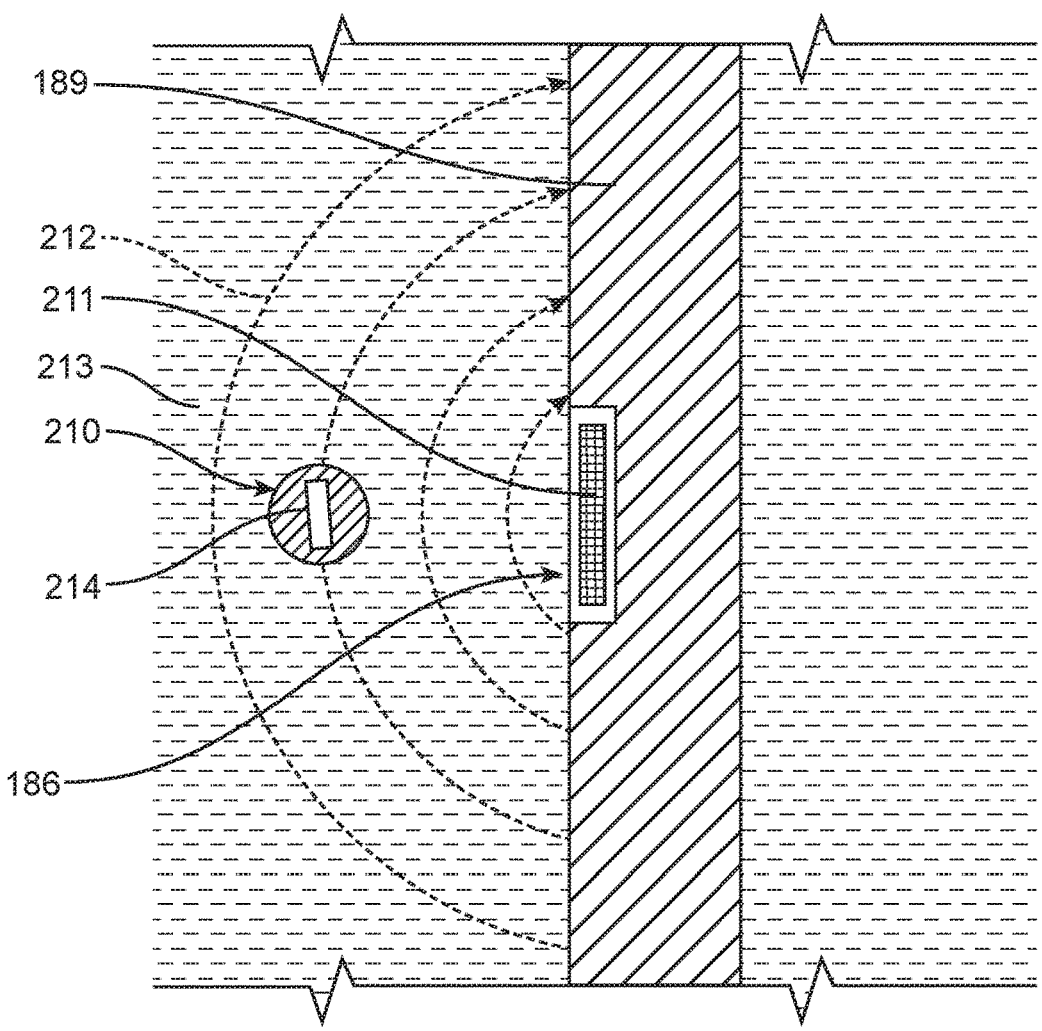
FIG. 9 is a diagram illustrating the use of an electromagnetic tag in the cementing operation of FIG. 6.

FIG. 9 is a diagram illustrating the use of an electromagnetic tag in the cementing operation of FIG. 6. In this case, the sensor 186 includes a conductive wire coil 211 wound around the circumference of the production casing 211. The coil 211 is excited with an alternating electrical current in a range of about 10 Hz to 200 Hz to produce an alternating magnetic field 212 emanating from the sensor 186 into the annulus 213. The magnetic field 212 is received by a ferromagnetic strip 214 acting as the core of an antenna or acting as an odd harmonic generator. The ferromagnetic strip 214, for example, is made of a material having a high magnetic permeability, such as PERMALLOY nickel-iron alloy. In this case the sensor 211 can detect the presence of the tag 210 in the same way that ferromagnetic strips are commonly detected in the security tags of library books and articles of clothing in department stores.

Figure 10:
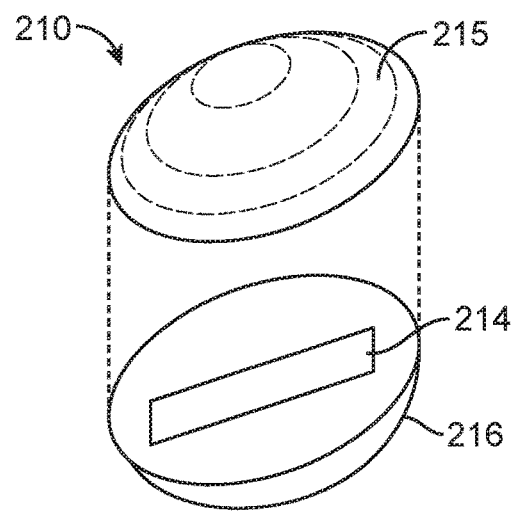
FIG. 10 is an exploded view of the electromagnetic tag introduced in FIG. 9.

FIG. 10 shows further details of the electromagnetic tag 210. The ferromagnetic strip 214 is sandwiched between two hemispherical parts 215 and 216. For example, the hemispherical parts 215, 216 are molded from Portland cement, and are bonded together with a layer of Portland cement. In an alternative construction, cement or resin is molded around a continuous ferromagnetic strip or wire to form a string of beads, and once the beads would harden, the ferromagnetic strip or wire is cut between the beads to separate the beads. It also is possible to mix electromagnetic tags in the form of chopped ferromagnetic wire directly into the cement slurry, without using anything assembled or molded around the chopped ferromagnetic wire to aid dispersal and transport of the chopped ferromagnetic wire in the cement slurry.

The electromagnetic tags also can be active. An active electromagnetic tag can be similar to the acoustic tag 110 in FIG. 7 except that an antenna is substituted for the acoustic transducer chip 196. The antenna, for example, is a coil of wire. The active tags can also be similar to the kind of radio frequency identification (RFID) tags commonly used for identifying or tracking merchandise and animals. For example, each sensor (185, 186, 187, 188 in FIG. 6) has an RF transceiver that interrogates the RFID tags with RF energy at 125 kHz to activate the RFID tags within a range of 0.1 m to 5 m. Alternatively, the RF transceiver interrogates the RFID tags with RF energy at 13.5 MHz to activate the RFID tags within a range of 0.05 m to 0.5 m. Alternatively, the RF transceiver interrogates the RFID tags with RF energy at 915 MHz to activate RFID tags within a range of 0.03 m to 0.1 m. Alternatively, the RF transceiver interrogates the RFID tags with RF energy at 2.4 GHz to activate the RFID tags within a range of 0.01 m to 0.05 m.

For use in cement, small active or passive acoustic or RF tags are desired so that the tags are pumpable without damaging the sensors and/or without having the sensors undesirably settle out (e.g., screen out) in the pumping equipment (6 in FIG. 1) and/or upon placement in the wellbore. For example, the tags may have dimensions (e.g., diameters or other dimensions) that range from nanoscale, e.g., about 1 to 1000 nm, to a micrometer range, e.g., about 1 to 1000 micrometer, or alternatively any size from about 1 nm to about 1 mm. The tags can be encapsulated so that the encapsulated tags have a density matching the density of the cement slurry. Then the encapsulated tags will not float or sink in the cement slurry under the force of gravity.

The concentration/loading of the tags within the cement slurry may be selected to provide a sufficient average distance between tags to allow for networking of the sensors (e.g., daisy-chaining) for examples using such networks. For example, such distance may be a percentage of the average communication distance for a given sensor type. By way of example, a given sensor having a 2 inch communication range in a given cement slurry should be loaded into the cement slurry in an amount that the average distance between sensors in less than 2 inches (e.g., less than 1.9, 1.8, 1.7, 1.6, 1.5, 1.4, 1.3, 1.2, 1.1, 1.0, etc. inches).

For example, the cement slurry comprises an effective amount of tags such that sensed readings may be obtained at intervals of about 1 foot, alternatively about 6 inches, or alternatively about 1 inch, along the portion of the wellbore containing the tags. For example, the tags may be present in the cement slurry in an amount of from about 0.001 to about 10 weight percent. Alternatively, the tags may be present in the cement slurry in an amount of from about 0.01 to about 5 weight percent. In some examples, the tags may be present in the cement slurry in an amount of from about 5 volume percent to about 30 volume percent.

Figure 11:
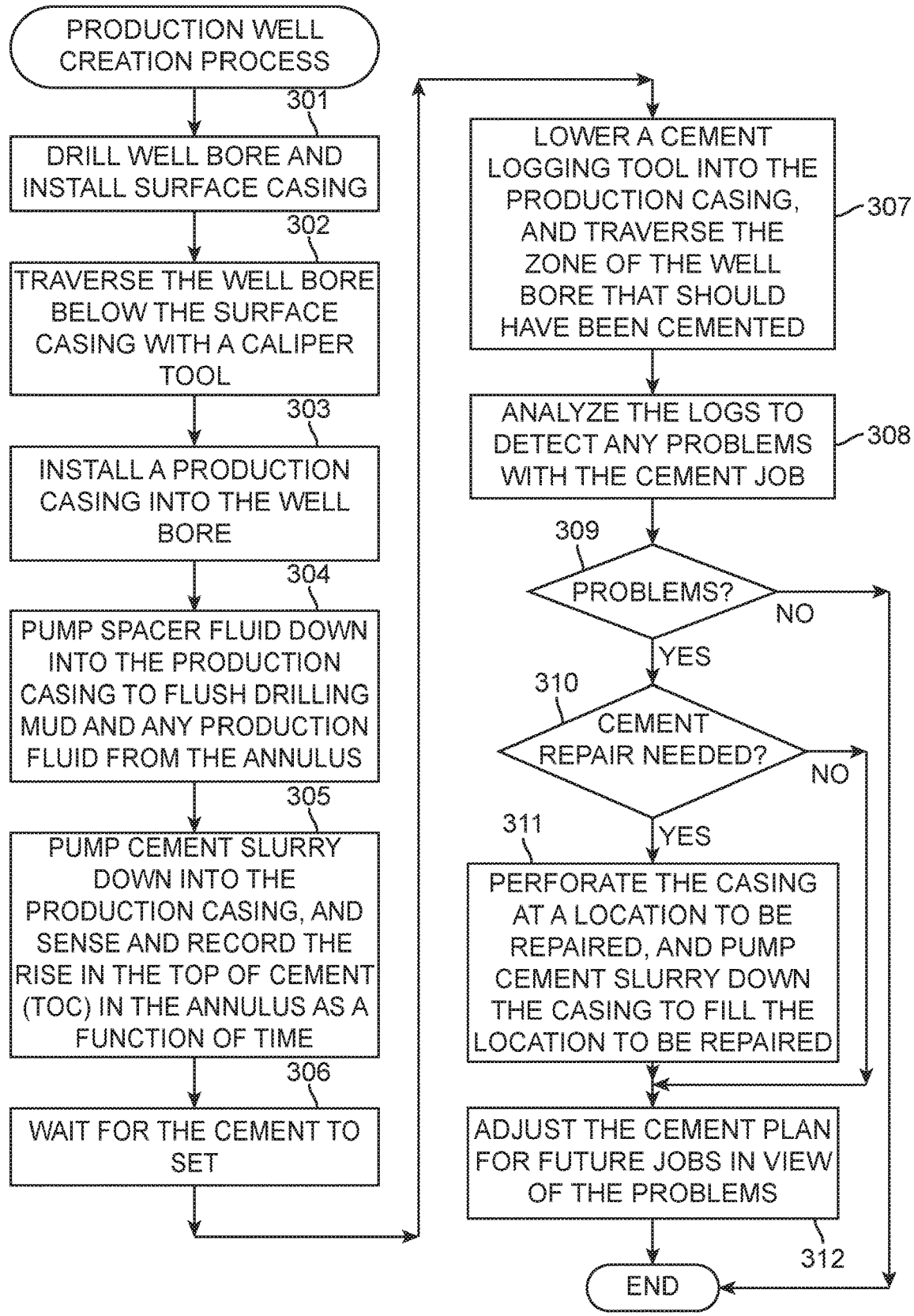
FIG. 11 is flowchart of operations performed when using the cementing system of FIG. 4 in accordance with certain embodiments of the present disclosure.

FIG. 11 shows where the cementing process occurs in the process of creating a production well. In a first box 301, the well bore is drilled, and the surface casing is installed. Next, in box 302, a caliper tool is lowered though the surface casing, and the well bore below the surface casing is traversed with the caliper tool in order to obtain a caliper log of the well bore profile. For example, the caliper tool measures the well bore diameter from acoustic and ultrasonic echo information, or from light scatter, or from electromagnetic interaction with the formation surrounding the well bore, or a combination of these methods. It is also possible to include a caliper tool in the drill string used to drill the well bore in box 301, so that a caliper log is obtained while drilling or when the drill string is pulled out of the well bore. In any case, the caliper log is used determine the mean diameter of the well bore before the pumping of cement commences, for example at least two days before the pumping of cement commences.

Next, in box 303, a production casing is installed into the well bore. Typically the production casing is assembled from tubular segments and installed into the well bore by lowering a first segment into the well bore and then screwing a second segment at the surface onto the top of the first segment to create a casing string and then lowering the casing string further into the well bore. Then a third segment at the surface is screwed onto the top of the second segment and then the casing string is again lowered further into the well bore. This process is repeated for as many additional tubular segments as need to extend the casing string to the bottom of the well bore.

Once the production casing has been installed, in box 304 spacer fluid is pumped down into the production casing. The spacer fluid flows out the bottom of the production casing and up into the annulus to flush drilling mud and any production fluid from the annulus. Then, in box 305, cement slurry is pumped down into the production casing, and the cement slurry flows out the bottom of the production casing and up into the annulus. Pumping continues, causing the top of cement (TOC) to rise in the annulus, and while the top of cement (TOC) is rising in the annulus, the position of the top of cement (TOC) in the annulus is sensed and recorded as a function of time. For example, a log of the TOC as a function of time is recorded, and the log contains a series of entries, and each entry has a time value and an associated depth value.

Eventually the TOC will rise to a maximum height when the pumping of the cement slurry has finished. Then in box 306 a sufficient amount of time passes for the cement slurry to set into a hard mass. Then in box 307 a cement logging tool is lowered into the production casing, and the cement logging tool traverses the zone of the well bore that should have been cemented. The cement logging tool produces a cement log of the presence and integrity of cement in the annulus over the zone that should have been cemented.

In box 308, analysis of the caliper log, the TOC log, and the cement log detects any problems with the cement job. A mean well bore diameter is computed from measurements of the well bore diameter recorded in the caliper log, as further described below with reference to FIGS. 12 to 14. The TOC log is a recording of the rise in the sensed position of the top of the cement slurry in the annulus as a function of time. Analysis of the TOC log may include computing a net outflow of fluid from the annulus into the formation from this recording of the rise in the sensed position of the top of the cement slurry in the annulus as a function of time, as further described below with reference to FIGS. 17, 18, and 19. Analysis of the TOC log may further include computing an estimate of mean well bore diameter from this recording of the rise in the sensed position of the top of the cement slurry in the annulus as a function of time, as further described below with reference to FIG. 20. Analysis of the TOC log may further include comparing the estimate of mean well bore diameter to the mean wellbore diameter computed from the measurements of the well bore diameter in the caliper log, in order to identify depths where the estimate of mean well bore diameter deviates from the mean well bore diameter computed from the caliper log, as further described below with reference to FIG. 21. Therefore the analysis in box 308 may identify problems occurring at particular depths in the bore hole, as further described below with reference to FIGS. 21 and 22.

In box 309, if problems are not detected, then the process in FIG. 11 is finished. Otherwise, the process continues to box 310. In box 310, if the problems are such that a cement repair is needed, then the process continues to box 311. In box 311, the cement is repaired by perforating the production casing at a location to be repaired, and pumping cement slurry down the casing so that the cement slurry flows through the perforation in the casing and fills any void in the annulus at the location to be repaired.

After box 311, the process continues in box 312. The process also continues in box 312 from box 310 if a cement repair is not needed. Thus, if any problems were detected in box 309, the process reaches box 312. In box 312 the cement plan for future jobs is adjusted in view of the problems detected in box 309. For example, if a cement repair was required at a zone of a soft rock layer in the surrounding formation, then in a neighboring well bore that has not yet been cemented, it could be prudent to install a centralizer or an expanding sleeve on the production casing at the depth where this soft rock layer would occur in the neighboring well bore.

Figure 12:
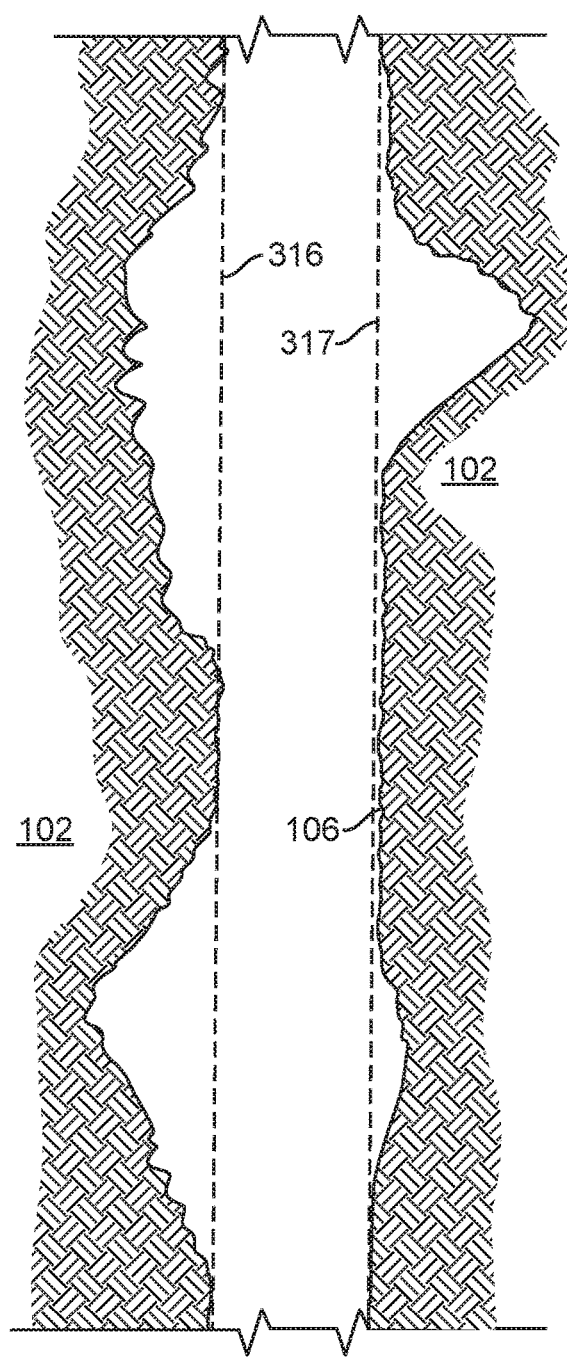
FIG. 12 is a diagram illustrating a well bore cross section in the system of FIG. 4.

FIG. 12 shows an example of a well bore cross section. The dashed lines 317, 318 indicate the targeted diameter of the well bore 106. Because of formation irregularities, the diameter of the well bore 106 could be more or less than the targeted diameter.

The caliper log data is representative of the well bore cross section in FIG. 12. For example, the caliper log includes multiple entries, each entry corresponds to a different depth in well bore, and each entry has multiple radii, and each radius corresponds to a radius of the well bore at a different angular position around the well bore. Therefore a well bore cross section similar to FIG. 31 can be computed and displayed from the caliper log.

Figure 13:
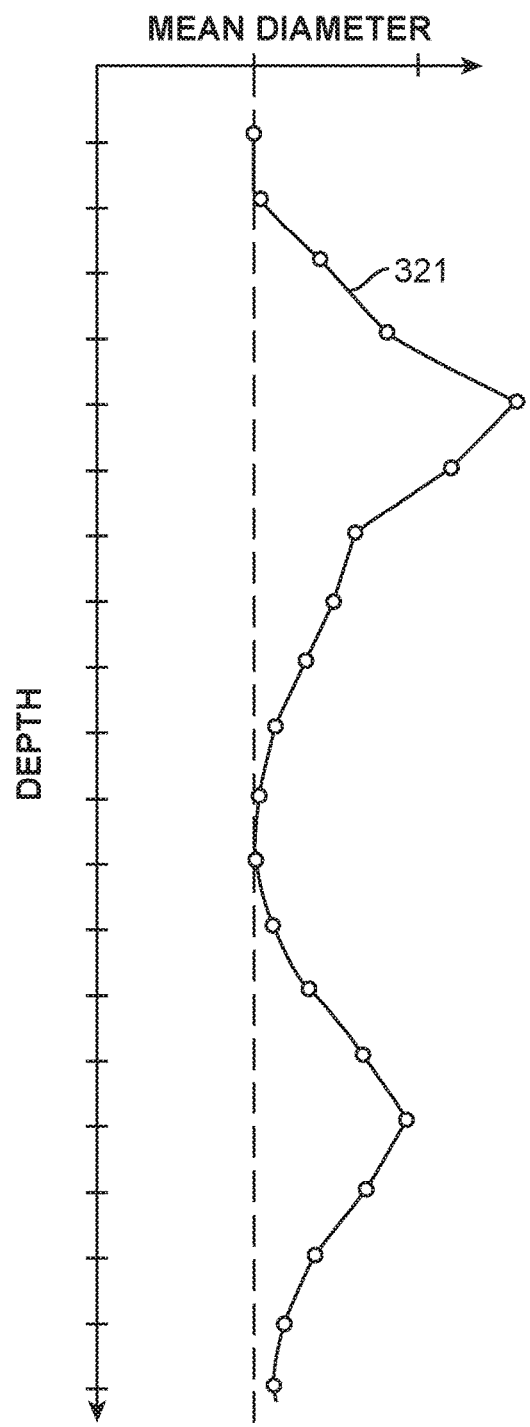
FIG. 13 is a graph of mean diameter as a function of depth for the well bore cross section in FIG. 12.
Figure 14:
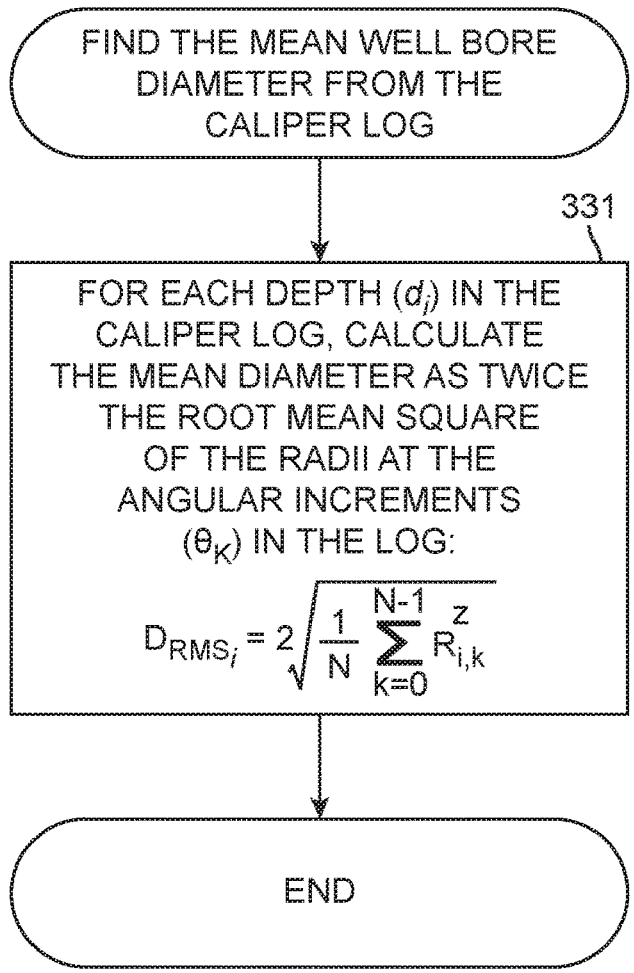
FIG. 14 is a flowchart of a procedure for finding the mean diameter of a well bore from a caliper log.

For computing the amount of cement needed to fill the annulus, a mean diameter at each respective depth is computed as a root-mean-square average of the radii in the caliper log for the respective depth. FIG. 13 shows a graph 321 of such a mean diameter as a function of depth corresponding to the well bore profile of FIG. 12. FIG. 14 shows the calculation of such a mean diameter in box 331. A root-mean-square average is advantageous because it corresponds to the area of the well bore in a plane perpendicular to the depth axis of the well bore (according to the formula $A=\pi R^2$). Therefore the amount cement needed for filling the annulus at a given depth is directly proportional to the difference between this area and the cross-sectional area of the production casing in a plane perpendicular to the depth axis. Also the rate of TOC rise at a given depth is inversely proportional to the difference between this area and the cross-sectional area of the production casing in a plane perpendicular to the depth axis. Therefore a mean diameter computed from a root-mean-square average of well bore radii is also useful for analysis of the rate of TOC rise as a function of depth in view of the caliper log data.

Figure 15:
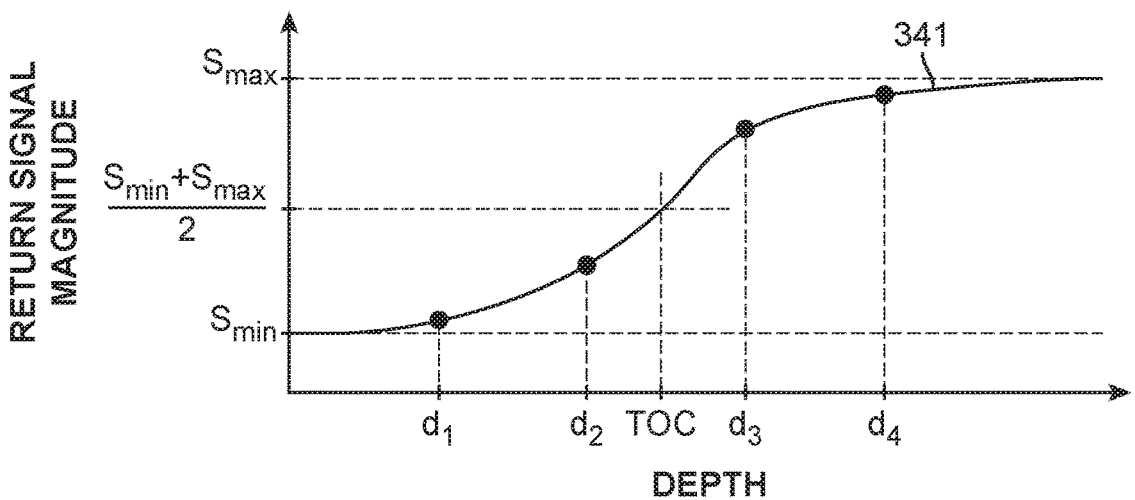
FIG. 15 is a graph of return signal magnitude as a function of depth when sensing the top of cement (TOC) position during a cementing operation.
Figure 16:
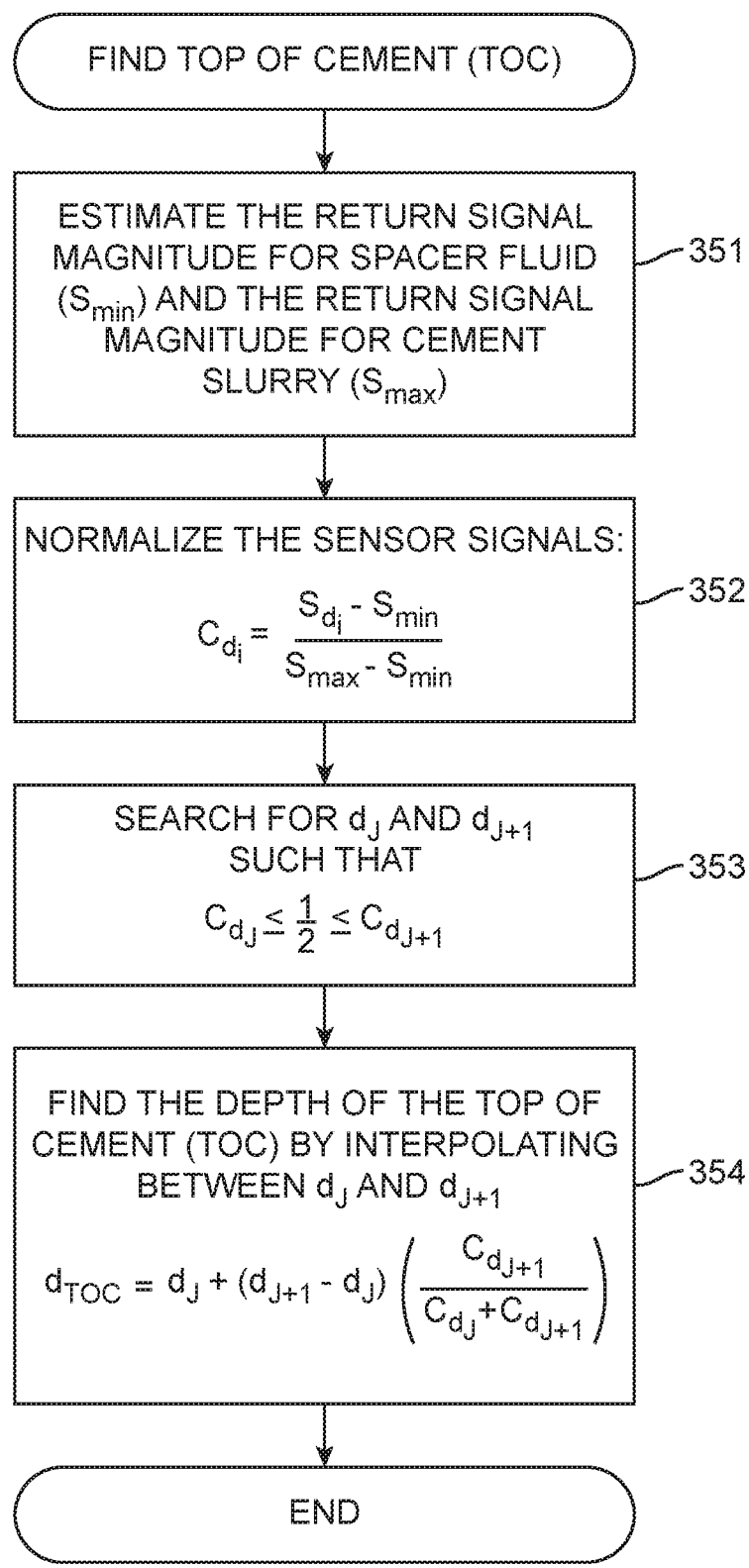
FIG. 16 is a flowchart of a method of computing the top of cement (TOC) position from a number of sensor signals.

FIGS. 15 and 16 show a method of determining the depth of the top of cement at a given time from respective sensor signals at the given time from a linear array of for sensors at respective depths d1, d2, d3, and d4 at the given time. In particular, FIG. 15 shows a graph 341 of the magnitude of a return signal that would be sensed by a single sensor as a function of depth of the single sensor. In this example, the return signal magnitude is indicative of the presence of any cement at the depth of the single sensor, such that the return signal has a minimum magnitude ($S_{min}$) when there is spacer fluid in the annulus at the depth of the single sensor, and the return signal has a maximum magnitude ($S_{max}$) when there is cement slurry in the annulus at the depth of the single sensor. Moreover, the return signal has a mean value between $S_{min}$ and $S_{max}$, such as ($S_{min}+S_{max}$)/2, when the position of the top of cement (TOC) is at the depth of the single sensor.

The return signal magnitude (S) can be the magnitude of a combined signal returned from any active or passive tags within range of the sensor, or the return signal can be the magnitude of an electromagnetic or acoustic property that is a distinctive characteristic of the cement slurry itself, with or without any additives (such as ferromagnetic, magnetized, electrically conductive, or radioactive material) which may be mixed into the cement slurry to better distinguish the cement slurry from other fluids or materials that may be found in the wellbore annulus.

FIG. 16 shows one way of determining the top of cement (TOC) position from sensor return signals. In this example, the top of cement (TOC) position is computed from the sensor return signals sensed at a particular time by respective sensors at the depths $d_1$, $d_2$, $d_3$, and $d_4$ as shown in FIG. 15. In this example, $d_1<d_2<d_3<d_4$, and "i" will be used to index a particular one of these depths. In a first box 351, an estimate is obtained for the return signal magnitude ($S_{min}$) for spacer fluid, and for the return signal magnitude ($S_{max}$) for cement slurry. For example, these estimates are obtained experimentally from a test well bore using a similar production casing and well bore diameter, and these estimates are adjusted later based upon a comparison to maximum and minimum values of return signals recorded from the sensors in the production casing in the production well (in box 305 in FIG. 11). For the example of FIG. 15, ($S_{min}$) could be estimated as the return signal magnitude $S_1$ obtained at the depth $d_1$, and ($S_{max}$) could be estimated as the return signal magnitude $S_4$ obtained at the depth $d_4$.

In box 352, the sensor signals are normalized to provide values ($C_{di}$) between zero and one indicating respective confidences that cement is present at the various depths di. For example, the value of $C_{di}$ is computed as ($S_{di}-S_{min}$)/($S_{max}-S_{min}$).

In box 353, the $C_{di}$ values are searched to find two neighboring sensor positions $d_J$ and $d_{J+1}$ such that $C_{dJ} \leq \frac{1}{2} C_{d(J+1)}$. Finally, in box 354, the depth ($d_{TOC}$) of the top of cement (TOC) is calculated by interpolating between $d_J$ and $d_{J+1}$ in accordance with the values of $C_{dJ}$ and $C_{d(J+1)}$; for example, $d_{TOC}=d_J+(d_{J+1}-d_{J+1})(C_{d(J+1)}/C_{dJ}+C_{d(J+1)})$.

Another way of determining the top of cement (TOC) position from sensor return signals is to mix active acoustic tags into the cement slurry and measure the transit time from the time that the sensor sends an interrogation pulse to the time that the sensor receives a return signal from any of the active acoustic tags. If a sensor is receiving strong return signals having a minimal transit time, then the sensor is at a depth next to the cement so that the sensor is at or below the TOC. If a sensor is receiving return signals and these return signals have a transit time greater than the minimal transit time, then the sensor is above the TOC by a distance proportional to the difference between the transit time and the minimal transit time. The proportionality constant in this case is one-half of a mean velocity of the acoustic signal traveling between the sensor and the TOC. If a sensor is not receiving a return signal, then any cement is far from the sensor, and the TOC is below the sensor once the cement slurry has been pumped into the bottom of the annulus.

Figure 17:
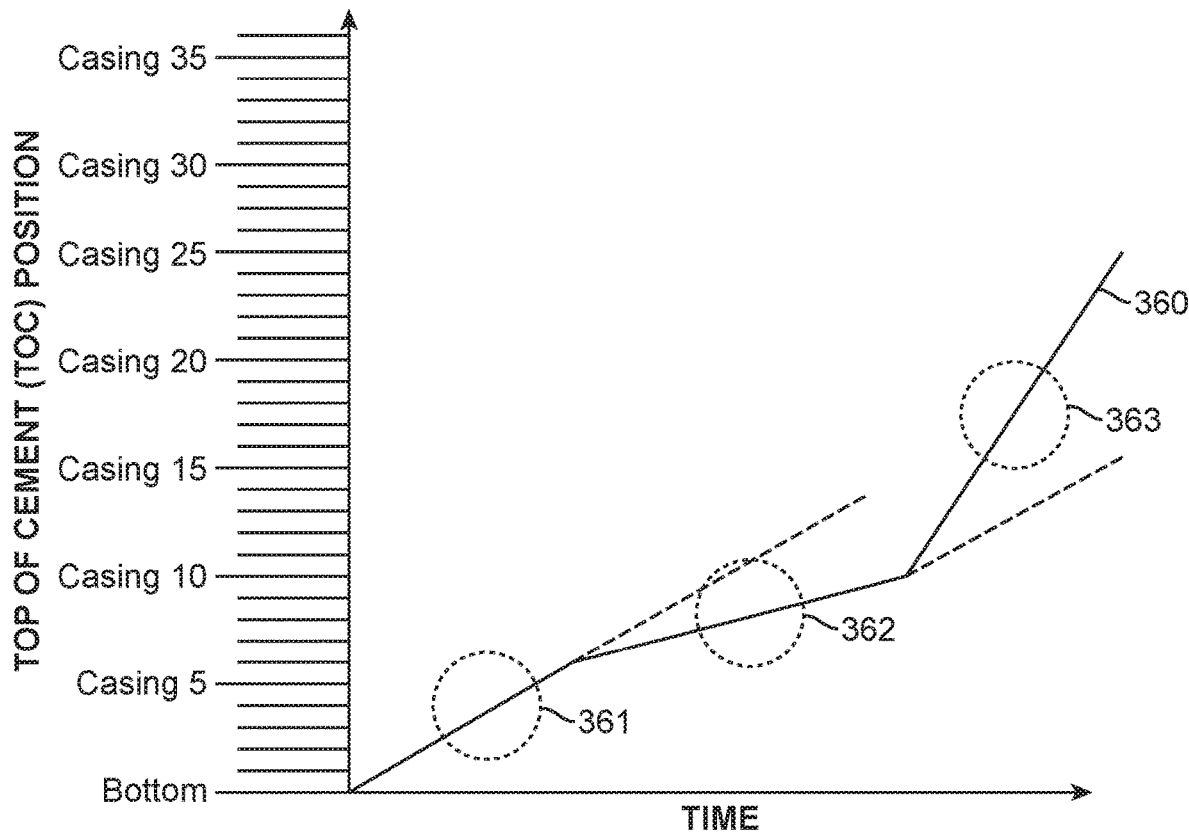
FIG. 17 is a graph of the top of cement (TOC) position as a function of time when various conditions occur during a cementing operation.

FIG. 17 shows a graph 360 of the top of cement (TOC) position as a function of time when various conditions occur during a cementing operation. In this example, the production casing is a string of equal length tubular segments, and the depth in the well bore is indicated in terms of the number of tubular segments counted from the bottom of the production casing. Thus, the bottom of the production casing is the bottom the first casing segment, and "Casing 5" designates the position of the top of the fifth casing segment.

In FIG. 17, the graph 360 includes three regions of different slope when cement slurry is pumped at a constant rate down the production casing. In this example, over all three regions, the annulus around the production casing has a constant cross-sectional area.

A first region 361 extends over the first six casing segments, and while the TOC rises through this first region, there is a normal flow of cement slurry into the annulus around the production casing in the well bore. In other words, in this first region 361, the rate of rise of the TOC position is directly proportional to the cement slurry pump rate and inversely proportional to the cross-sectional area of the annulus.

A second region 362 extends over casing segments seven to ten, and while the TOC rises through this second region, the slope of the graph 360 is less than the slope in the first region 361, indicating that there are losses to the flow rate of the cement slurry in the annulus. For example, there could be a fissure in the wall of the well bore around the bottom of the casing segment ten, and there could be a flow of cement slurry out of the annulus into this fissure and into the surrounding formation.

A third region 363 extends over casing segments eleven to twenty-five, and while the TOC rises through this third region, the slope of the graph 360 is greater than the slope in the first region 316, indicating that there is an influx of fluid into the annulus. For example, a fissure could have opened up in the wall of the well bore somewhere below the casing segment ten, and water or production fluid could be flowing through this fissure from the foundation and into the annulus.

Figure 18:
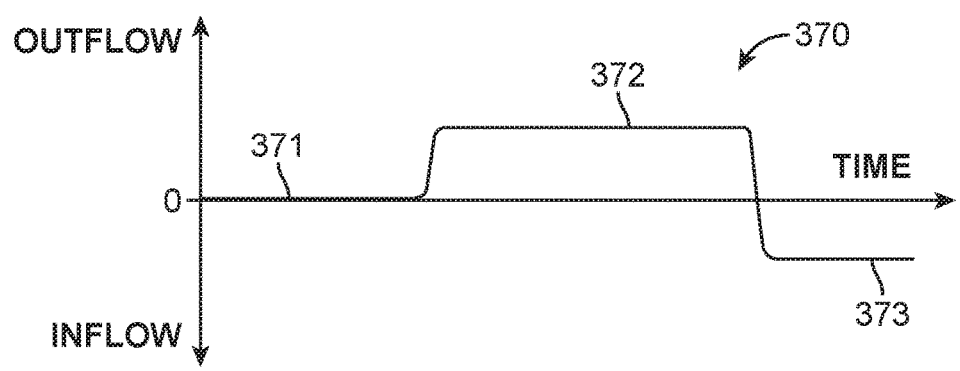
FIG. 18 is a graph of net fluid outflow from the annulus into the formation for the example in FIG. 37.

FIG. 18 shows a graph 370 of net fluid outflow from the annulus into the formation for the example in FIG. 17. The net outflow can be computed from the graph 360 in FIG. 17 taking into consideration the mean diameter of the well bore as a function of depth. The graph 370 has a first region 361 where the net fluid outflow is zero, a second region 372 where the net fluid outflow is a maximum and is positive indicating a fluid outflow, and a third region 373 where the net fluid outflow is a minimum and is negative indicating a fluid inflow.

Figure 19:
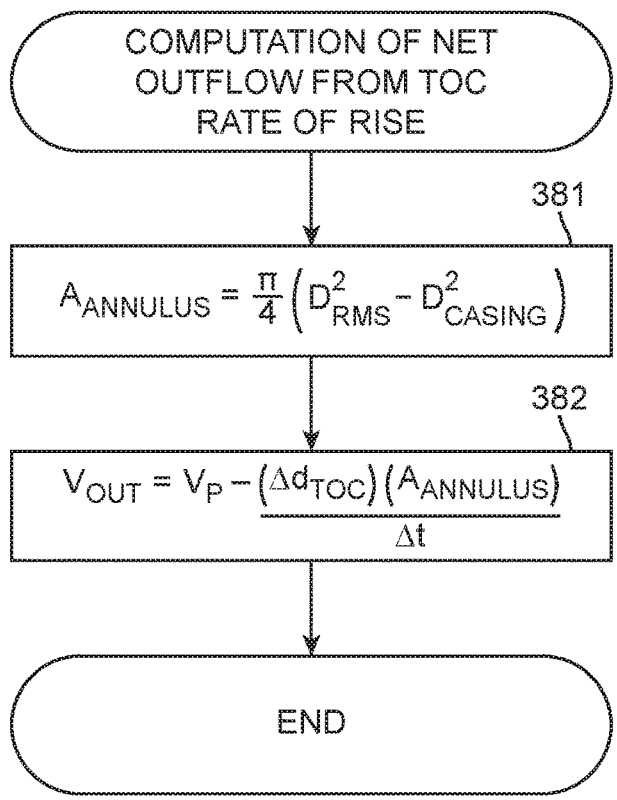
FIG. 19 is a flowchart of a method of computing the net fluid outflow from the annulus into the formation.

FIG. 19 shows a method of computing the net fluid outflow from the rate of rise in top of cement (TOC) position. The rate of rise in the TOC position is a change in TOC position ($\Delta d_{TOC}$) divided by the duration of time ($\Delta t$) over which the change in TOC position occurs. For example, these changes are differences between the depth and time values, respectively, in two neighboring TOC log entries. In a first box 381, the cross-sectional area of the annulus ($A_{ANNULUS}$) is computed as $\pi/4$ times the difference between the square of the mean diameter ($D_{RMS}$) of the well bore and the square of the outer diameter ($D_{CASING}$) of the production casing. Finally, in box 382, the net fluid outflow ($V_{OUT}$) is computed as the difference between the slurry pump rate ($V_P$) and the product of the rate of rise in the TOC position ($\Delta d_{TOC}/\Delta t$) times the cross-sectional area of the annulus ($A_{ANNULUS}$).

Figure 20:
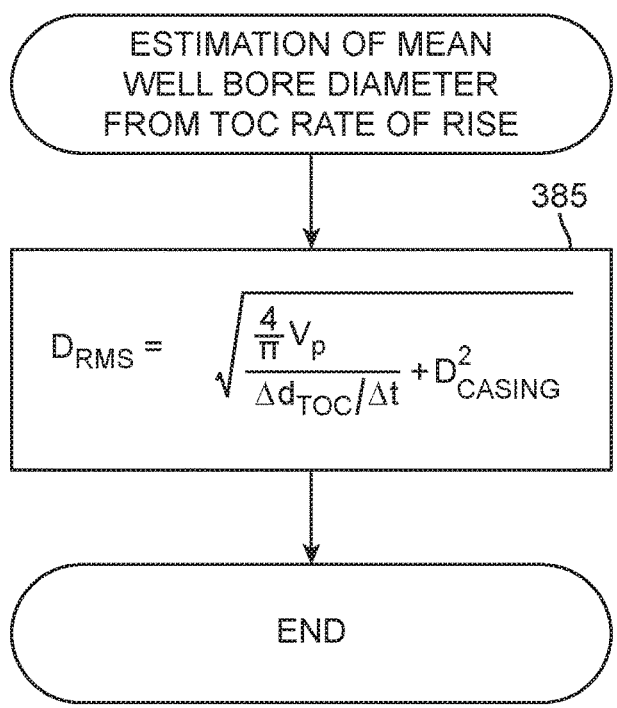
FIG. 20 is a flowchart of a method of estimating mean well bore diameter from the rate of rise of the top of cement (TOC) position.

The TOC rate of rise can also be used to estimate the mean well bore diameter. As shown in FIG. 20, in box 385, an estimate of the mean well bore diameter ($D_{RMS}$) is computed as the square root of the sum of ($4/\pi$) times the slurry pump rate ($V_P$) divided by the TOC rate of rise ($\Delta d_{TOC}/\Delta t$), and the square of the outer diameter ($D_{CASING}$) of the production casing.

Figure 21:
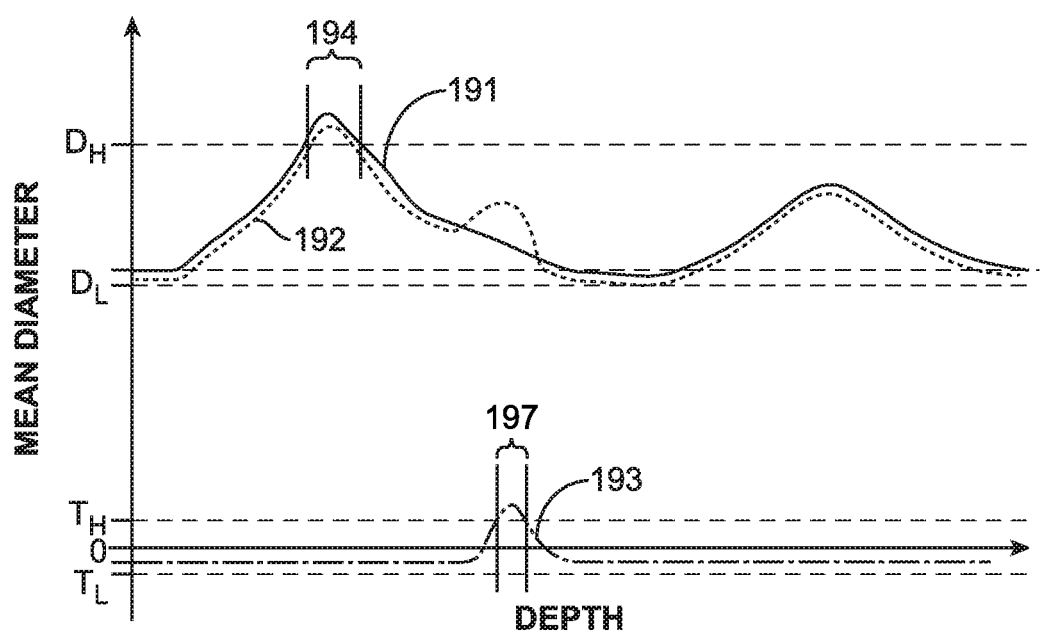
FIG. 21 is a graph of mean diameter as a function of depth for mean diameters computed from a caliper log and estimated from the rate of rise of the top of cement (TOC) position, and for the difference between these two mean diameters.

FIG. 21 shows a way of graphically and numerically comparing caliper log data to the TOC log data to identify anomalies. FIG. 21 includes a first graph 191, shown as a solid line, of the mean well bore diameter as a function of depth, as computed from the caliper log data, for example by using the method of FIG. 34. FIG. 21 includes a second graph 192, shown as a dashed line, of the estimated mean well bore diameter as function of depth, as computed from the caliper log data, for example using the method of FIG. 20. The two graphs 191, 192 are displayed together on the same pair of axes to emphasize any anomalies where the two graphs diverge. FIG. 21 also includes a third graph 193 of the difference between the second graph and the first graph.

FIG. 21 also shows a comparison of the mean diameters in the graphs 191 and 192 to a high threshold ($D_H$) and a low threshold ($D_L$). An anomaly is indicated, for example by change in color or by highlighting, if the mean diameter is greater than the high threshold or lesser than the low threshold. Thus, in FIG. 21, an anomalous zone 194 is indicated where the mean diameter computed from the caliper log is greater than the high threshold.

FIG. 21 further shows a comparison of the third graph to a positive high threshold ($T_H$) and a negative low threshold ($T_L$). An anomaly similar to a fluid outflow is indicated if the difference is greater than the high threshold, and an anomaly similar to a fluid inflow is indicated if the difference is less than the low threshold. Thus, in FIG. 21, an anomalous zone 197 similar to a fluid outflow is indicated where the third graph exceeds the high positive threshold ($T_H$).

Figure 22:
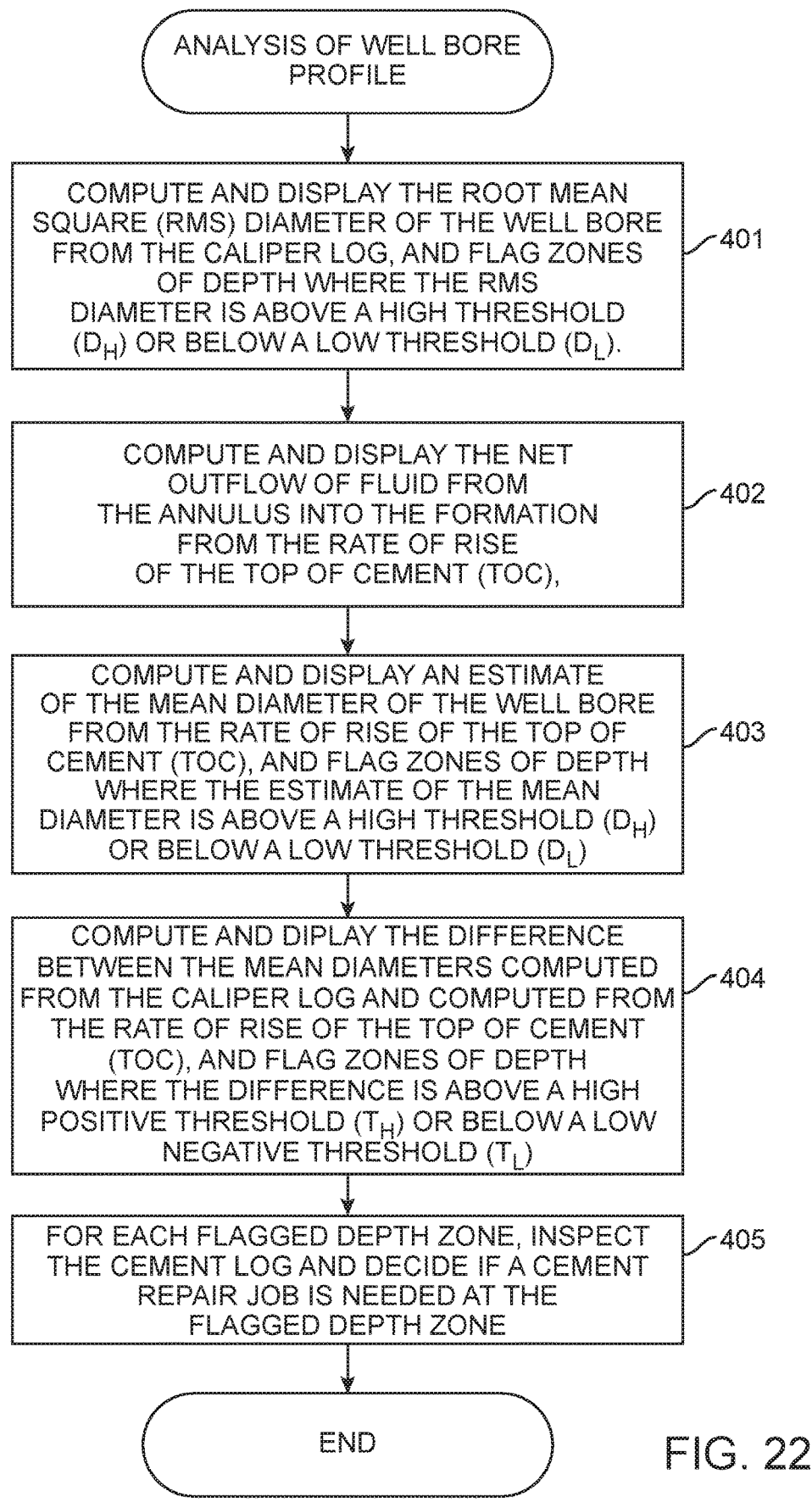
FIG. 22 is a flowchart of a method of analysis of the well bore profile using the various graphs and methods of FIGS. 14 to 21.

FIG. 22 shows a summary of the analysis of the well bore profile using the various graphs and methods of FIGS. 17 to 21. In a first box 401, the root mean square (RMS) diameter of the well bore is computed from the caliper log and displayed as function of depth, and zones of depth are flagged where the RMS diameter from the caliper log is above a high threshold ($D_H$) or below a low threshold ($D_L$).

In box 402, the net outflow of fluid from the annulus into the formation is computed from the rate of rise of the top of cement (TOC). The net outflow is displayed as a function of time or as a function of depth.

In box 403, an estimate of the mean diameter of the well bore is computed from the rate of rise of the top of cement (TOC), and displayed as a function of depth. Zones of depth are flagged where the estimate of the mean diameter computed from the rate of rise of the TOC is above a high threshold ($D_H$) or below a low threshold ($D_L$).

In box 404, the difference between the mean diameter computed from the rate of rise of the TOC and RMS diameter computed from the caliper log is computed, and this difference is displayed. Zones of depth are flagged where this difference is above a high positive threshold ($T_H$) or below a low negative threshold ($T_L$).

Finally, in box 405, for each flagged depth zone, the cement log is inspected in order to decide if a cement repair job is needed.

Numerous examples are provided herein to enhance understanding of the present disclosure. A specific set of examples are provided as follows.

In a first example, there is disclosed a method of cementing a well casing in a well bore in a subterranean formation. The method includes pumping cement slurry down into the well casing so that the cement slurry flows up into an annulus surrounding the well casing in the well bore, and while pumping the cement slurry down into the well bore, sensing position of a top of the cement slurry in the annulus and recording a rise of the sensed position of the top of the cement slurry in the annulus as a function of time. The method further includes analyzing the recording of the rise in the sensed position of the top of the cement slurry in the annulus as a function of time to evaluate the cementing of the well casing in the well bore.

In a second example, there is disclosed a method according to the preceding example, wherein the analyzing of the recording of the rise in the sensed position of the top of the cement slurry in the annulus as a function of time indicates a problem, and the method further includes adjusting a cement plan for a future cement job in view of the problem.

In a third example, there is disclosed a method according to any of the preceding examples, wherein the analyzing of the recording of the rise in the sensed position of the top of the cement slurry in the annulus as a function of time indicates a need to repair a location of the cement after the cement has set in the annulus, and the method further includes repairing the location of the cement after the cement has set in the annulus by perforating the well casing at the location to be repaired, and pumping cement slurry down the well casing to fill the location to be repaired.

In a fourth example, there is disclosed a method according to any of the preceding examples, wherein the sensing of the position of a top of the cement slurry in the annulus while pumping the cement slurry down into the well casing includes raising a sensor tool in the well casing while pumping the cement slurry down into the well bore, and the sensor tool includes at least one sensor providing a signal indicating position of the top of the cement slurry in the annulus.

In a fifth example, there is disclosed a method according to any of the preceding examples, wherein sensors are attached to the well casing at respective depths along the well casing, and the sensors provide respective signals indicating position of the top of the cement slurry in the annulus.

In a sixth example, there is disclosed a method according to any of the preceding examples, which further includes adding tags to the cement slurry, and the sensing of the position of a top of the cement slurry in the annulus while pumping the cement slurry down into the well bore includes sensing the presence of the tags in the cement slurry in the annulus.

In a seventh example, there is disclosed a method according to the sixth example, wherein the tags are acoustic tags that transmit acoustic return signals in response to receiving acoustic interrogation signals.

In an eighth example, there is disclosed a method according to the sixth example, wherein the tags are electromagnetic tags that return electromagnetic return signals in response to receiving electromagnetic interrogation signals.

In a ninth example, there is disclosed a method according to the preceding sixth example, wherein the tags are active tags sensing local properties of the cement slurry, and the tags communicate among themselves to relay information about the sensed local properties of the cement slurry up the well bore.

In a tenth example, there is disclosed a method according to any of the preceding examples, wherein the analyzing of the recording of the rise in the sensed position of the top of the cement slurry in the annulus as a function of time includes computing a net outflow of fluid from the annulus into the formation from the recording of the rise in the sensed position of the top of the cement slurry in the annulus as a function of time.

In a eleventh example, there is disclosed a method according to any of the preceding examples, wherein the analyzing of the recording of the rise in the sensed position of the top of the cement slurry in the annulus includes computing an estimate of mean well bore diameter from the recording of the rise in the sensed position of the top of the cement slurry in the annulus as a function of time.

In an twelfth example, there is disclosed a method according to any of the preceding examples, wherein the analyzing of the recording of the rise in the sensed position of the top of the cement slurry in the annulus further includes comparing the estimate of mean well bore diameter to a mean wellbore diameter computed from a caliper log of measurements of the well bore diameter to identify depths where the estimate of mean well bore diameter deviates from the mean well bore diameter computed from the caliper log of measurements of the well bore diameter.

In a thirteenth example, there is disclosed apparatus for evaluating a cementing of a well casing in a well bore in a subterranean formation. The apparatus includes at least one sensor responsive to a rise in position of a top of cement slurry in an annulus around the well casing in the well bore as a function of time while cement slurry is pumped down into the well casing so that the cement slurry flows up into the annulus. The apparatus further includes a computer coupled to the at least one sensor to obtain a recording of the rise in position of the top of the cement slurry in the annulus as a function of time, the computer including a data processor and non-transitory data storage storing instructions that, when executed by the data processor, analyze the recording of the rise in the position of the top of the cement slurry in the annulus as a function of time to evaluate the cementing of the well casing in the well bore.

In a fourteenth example, there is disclosed apparatus according to the preceding thirteenth example, further including a tool to which said at least one sensor is mounted, the tool being insertable in the well casing to sense the rise in the position of the top of the cement slurry in the annulus as a function of when the tool is raised in the well casing while the cement slurry is pumped down into the well casing.

In a fifteenth example, there is disclosed apparatus according to any of the preceding examples, further comprising a length of the well casing and sensors including said at least one sensor, the sensors being attached to the length of the well casing at respective depths along the well casing, the sensors being coupled to the computer to provide respective signals indicating position of the top of the cement slurry in the annulus.

In a sixteenth example, there is disclosed apparatus according to any of the preceding examples, further comprising tags capable of being sensed by said at least one sensor when the tags are in the cement slurry in the annulus.

In a seventeenth example, there is disclosed apparatus according to the preceding sixteenth example, wherein the tags are acoustic tags that transmit acoustic return signals in response to receiving acoustic interrogation signals.

In a eighteenth example, there is disclosed apparatus according the preceding sixteenth example, wherein the tags are electromagnetic tags that return electromagnetic return signals in response to receiving electromagnetic interrogation signals.

In an nineteenth example, there is disclosed apparatus according to any of the preceding examples, wherein the instructions are executable by the data processor to compute a net outflow of fluid from the annulus into the formation from the recording of the rise in the position of the top of the cement slurry in the annulus as a function of time.

In a twentieth example, there is disclosed apparatus according to any of the preceding examples, wherein the instructions are executable by the data processor to compute an estimate of mean well bore diameter from the recording of the rise in the position of the top of the cement slurry in the annulus as a function of time.

In a twenty-first example, there is disclosed apparatus according to any of the preceding examples, wherein the instructions are executable by the data processor to compare the estimate of mean well bore diameter to a mean wellbore diameter computed from a caliper log of measurements of the well bore diameter to identify depths where the estimate of mean well bore diameter deviates from the mean well bore diameter computed from the caliper log of measurements of the well bore diameter.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A method of cementing a well casing in a well bore in a subterranean formation, said method comprising:
   (a) pumping cement slurry down into the well casing so that the cement slurry flows up into an annulus around the well casing in the well bore, and while pumping the cement slurry down into the well bore, sensing position of a top of the cement slurry in the annulus and recording a rise of the sensed position of the top of the cement slurry in the annulus as a function of time; and
   (b) analyzing the recording of the rise in the sensed position of the top of the cement slurry in the annulus as a function of time to evaluate the cementing of the well casing in the well bore, wherein the analyzing of the recording of the rise in the sensed position of the top of the cement slurry in the annulus as a function of time includes computing an estimate of mean well bore diameter from the recording of the rise in the sensed position of the top of the cement slurry in the annulus as a function of time;
   (c) determining depths where the estimate of mean well bore diameter deviates from the mean well bore diameter computed from a logging measurement of the well bore diameter;
   (d) determining that a location of the cement is need of a repair based on the determining the depths where the mean well bore diameter deviates from the mean well bore diameter computed from a logging measurement, the need of repair comprising a void in the annulus; and (e) repairing the location of the cement after the cement has set in the annulus by perforating the well casing at the location to be repaired, and pumping cement slurry down the well casing to fill the location to be repaired.

2. The method as claimed in claim 1, wherein if the analyzing of the recording of the rise in the sensed position of the top of the cement slurry in the annulus as a function of time indicates a void in the annulus, then the method further includes adjusting a cement plan for a future cement job in view of the problem, the adjusting comprising installing a centralizer or an expanding sleeve on a production casing.

3. The method as claimed in claim 1, wherein the sensing of the position of a top of the cement slurry in the annulus while pumping the cement slurry down into the well casing includes raising a sensor tool in the well casing while pumping the cement slurry down into the well bore, and the sensor tool includes at least one sensor providing a signal indicating position of the top of the cement slurry in the annulus.

4. The method as claimed in claim 1, wherein sensors are attached to the well casing at respective depths along the well casing, and the sensors provide respective signals indicating position of the top of the cement slurry in the annulus.

5. The method as claimed in claim 1, which further includes adding tags to the cement slurry, and the sensing of the position of a top of the cement slurry in the annulus while pumping the cement slurry down into the well bore includes sensing the presence of the tags in the cement slurry in the annulus.

6. The method as claimed in claim 5, wherein the tags are acoustic tags that transmit acoustic return signals in response to receiving acoustic interrogation signals.

7. The method as claimed in claim 5, wherein the tags are electromagnetic tags that return electromagnetic return signals in response to receiving electromagnetic interrogation signals.

8. The method as claimed in claim 5, wherein the tags are active tags sensing local properties of the cement slurry, and the tags communicate among themselves to relay information about the sensed local properties of the cement slurry up the well bore.

9. The method as claimed in claim 1, wherein the analyzing of the recording of the rise in the sensed position of the top of the cement slurry in the annulus as a function of time includes computing a net outflow of fluid from the annulus into the formation from the recording of the rise in the sensed position of the top of the cement slurry in the annulus as a function of time.

10. The method as claimed in claim 1, wherein the logging measurement is a caliper log measurement, and wherein the analyzing of the recording of the rise in the sensed position of the top of the cement slurry in the annulus as a function of time further includes comparing the estimate of mean well bore diameter to a mean wellbore diameter computed from the caliper log of measurements of the well bore diameter to identify depths where the estimate of mean well bore diameter deviates from the mean well bore diameter computed from the caliper log of measurements of the well bore diameter.

11. The method as claimed in claim 1, wherein the leggin logging of measurement is a caliper log of measurements.

12. The method of claim 1 further comprising displaying the estimated mean well bore diameter and displaying the mean well bore diameter computed from a logging measurement and displaying the deviation between the estimate of mean well bore diameter and the mean well bore diameter computed from a logging measurement of the well bore.

13. The method of claim 12 wherein a deviation higher than a predetermined high threshold indicates a fluid outflow of the cement and a deviation lower than a predetermined low threshold of cement the indicates a fluid inflow.

14. Apparatus for evaluating a cementing of a well casing in a well bore in a subterranean formation, said apparatus comprising:

(a) at least one sensor responsive to a rise in position of a top of cement slurry in an annulus around the well casing in the well bore as a function of time while cement slurry is pumped down into the well casing so that the cement slurry flows up into the annulus; and (b) a computer coupled to said at least one sensor to obtain a recording of the rise in position of the top of the cement slurry in the annulus as a function of time, the computer including a data processor and non-transitory data storage storing instructions that, when executed by the data processor, analyze the recording of the rise in the position of the top of the cement slurry in the annulus as a function of time to evaluate the cementing of the well casing in the well bore, wherein the instructions are executable by the data processor to compute an estimate of mean well bore diameter from the recording of the rise in the position of the top of the cement slurry in the annulus as a function of time, and wherein the instructions are executable by the data processor to compare the estimate of mean well bore diameter to a mean wellbore diameter computed from a log of measurements of the well bore diameter to determine depths where the estimate of mean well bore diameter deviates from the mean well bore diameter computed from the log of measurements of the well bore diameter (c) determining that a location of the cement is need of a repair based on the determining the depths where the mean well bore diameter deviates from the mean well bore diameter computed from a logging measurement, the need of repair comprising a void in the annulus.

15. The apparatus as claimed in claim 14, further including a tool to which said at least one sensor is mounted, the tool being insertable in the well casing to sense the rise in the position of the top of the cement slurry in the annulus as a function of when the tool is raised in the well casing while the cement slurry is pumped down into the well casing.

16. The apparatus as claimed in claim 14, further comprising a length of the well casing and sensors including said at least one sensor, the sensors being attached to the length of the well casing at respective depths along the well casing, the sensors being coupled to the computer to provide respective signals indicating position of the top of the cement slurry in the annulus.

17. The apparatus as claimed in claim 14, further comprising tags capable of being sensed by said at least one sensor when the tags are in the cement slurry in the annulus.

18. The apparatus as claimed in claim 17, wherein the tags are acoustic tags that transmit acoustic return signals in response to receiving acoustic interrogation signals.

19. The apparatus as claimed in claim 17, wherein the tags are electromagnetic tags that return electromagnetic return signals in response to receiving electromagnetic interrogation signals.

20. The method as claimed in claim 14, wherein the instructions are executable by the data processor to compute a net outflow of fluid from the annulus into the formation from the recording of the rise in the position of the top of the cement slurry in the annulus as a function of time.

\* \* \* \* \*